(12) United States Patent
Haitani

(10) Patent No.: US 6,775,095 B2
(45) Date of Patent: Aug. 10, 2004

(54) FLOPPY DISC DRIVING DEVICE

(75) Inventor: Munehisa Haitani, Fukushima (JP)

(73) Assignee: Alps Electric Co., Ltd., Tokyo (JP)

( * ) Notice: Subject to any disclaimer, the term of this patent is extended or adjusted under 35 U.S.C. 154(b) by 418 days.

(21) Appl. No.: 09/944,621

(22) Filed: Aug. 30, 2001

(65) Prior Publication Data

US 2002/0027743 A1 Mar. 7, 2002

(30) Foreign Application Priority Data

Sep. 5, 2000 (JP) ....................... 2000-269002

(51) Int. Cl.[7] .............................................. G11B 33/00
(52) U.S. Cl. .................................................. 360/99.01
(58) Field of Search ............................. 360/99.01, 75, 360/78.04, 97.01; 361/685

(56) References Cited

U.S. PATENT DOCUMENTS

| | | | |
|---|---|---|---|
| 4,547,820 A | | 10/1985 | Saito ........................... 360/71 |
| 4,626,942 A | * | 12/1986 | Shoji et al. ............. 360/99.01 |
| 4,652,950 A | * | 3/1987 | Ichitani et al. ................ 360/75 |
| 4,658,307 A | | 4/1987 | Hiroshi et al. ................ 360/69 |
| 4,727,443 A | | 2/1988 | Miyake et al. ................ 360/75 |
| 4,809,115 A | | 2/1989 | Shibata et al. .............. 360/137 |
| 4,855,849 A | * | 8/1989 | Jones et al. .............. 360/97.01 |
| 4,967,291 A | * | 10/1990 | Touchton et al. ......... 360/78.04 |
| 5,278,718 A | | 1/1994 | Kim ........................... 360/137 |
| 5,301,293 A | | 4/1994 | Kano ......................... 711/112 |
| 5,734,549 A | | 3/1998 | Oura ........................... 361/685 |

FOREIGN PATENT DOCUMENTS

| | | |
|---|---|---|
| EP | 0766250 | 4/1997 |
| JP | 01042061 | 2/1989 |
| JP | 02183485 | 7/1990 |
| JP | 07262680 | 10/1995 |

OTHER PUBLICATIONS

European Search Report, issued Mar. 6, 2002, corresponding to EPA No. 01121215.6.

* cited by examiner

*Primary Examiner*—Tianjie Chen
(74) *Attorney, Agent, or Firm*—Brinks Hofer Gilson & Lione

(57) ABSTRACT

The invention provides a floppy disc driving device that is manufactured at a low cost and capable of maintaining light emitting brightness at a constant value continuously by using a membrane conductor for connection between a light emitting diode and an integrated circuit and by applying current driving of the light emitting diode. The floppy disc driving device is provided with a circuit substrate mounted on one side of a chassis on which at least an integrated circuit and an interface connector are mounted, a light emitting diode located near a diskette insertion slot that emits light when a floppy disc is rotatively driven, and a connection conductor that connects between the circuit substrate and the light emitting diode, wherein the connection conductor is the membrane conductor formed by spreading coating material on one side of the chassis, and wherein the light emitting diode is driven with a current supplied from the integrated circuit through the membrane conductor

2 Claims, 2 Drawing Sheets

FLOPPY DISC DRIVING DEVICE

BACKGROUND OF THE INVENTION

1. Field of the Invention

This invention relates to a floppy disc driving device (FDD), and more particularly relates to a floppy disc driving device (FDD) located near a diskette insertion drawer having a light emitting diode (LED) driving circuit for emitting light when a floppy disc is being rotatively driven to ensure driving of the light emitting diode and to save the driving circuit cost.

2. Description of the Related Art

Generally, a light emitting diode is located near a diskette insertion slot of a floppy disc driving device to light the light emitting diode when the floppy disc is rotatively driven for showing that the floppy disc is now being rotatively driven.

In the case of a floppy disc driving device described hereinabove, a diskette insertion slot and a light emitting diode are located on the front side of the floppy disc driving device whereas an interface connector to be connected to an external main control unit (computer) is located on the back side of the floppy disc driving device. An integrated circuit (IC) for controllably driving the floppy disc driving device is also located on the back side of the floppy disc driving device. As the result such a structure brings about a long distance and inevitably a long connection conductor between the light emitting diode and the integrated circuit.

FIG. 3 is a circuit diagram for showing a typical equivalent circuit of a light emitting diode driving circuit that has been used for a conventional floppy disc driving device.

As shown in FIG. 3, the light emitting diode driving circuit is provided with a light emitting diode 31, a flexible printed circuit (FPC) 32 that is a component of a connection conductor, a current limiting resistor 33, and a voltage driving power source 34 contained in the integrated circuit (not shown in the figure). In this case, because it is difficult to fix the connection conductor, which is served to connect between the light emitting diode 31 and the integrated circuit, in the internal of the floppy disc driving device, a connection conductor that is flat-shaped and has a flexible characteristic, typically a flexible printed circuit (FPC), is used. The flexible printed circuit 32 is provided with a flexible copper (Cu) first conductor $32_1$ and a flexible copper (Cu) second conductor $32_2$ that are located in parallel with insulation between them, and the flexible printed circuit 32 is flat and band-shaped as the whole.

The anode side of the light emitting diode 31 is connected to one end of the first conductor $32_1$ of the flexible printed circuit 32, and on the other hand the cathode side is connected to one end of the second conductor $32_2$ of the flexible printed circuit 32. One end of the current limiting resistor 33 is connected to the other end of the first conductor $32_1$ of the flexible printed circuit 32, and on the other hand the other end of the current limiting resistor 33 is connected to the positive side terminal of the voltage driving power source 34. The negative side terminal of the voltage driving power source 34 is connected to the other end of the second conductor $32_2$ of the flexible printed circuit 32.

When a diskette is inserted into the floppy disc driving device through the diskette insertion slot having the abovementioned configuration and a floppy disc in the inserted diskette is rotatively driven, the voltage driving power source 34 generates a driving voltage. The driving voltage causes a current flowing from the positive side terminal of the voltage driving power source 34 through the current limiting resistor 33, the first conductor $32_1$ of the flexible printed circuit 32, the anode of the light emitting diode 31, the cathode of the light emitting diode 31, and the second conductor $32_2$ of the flexible printed circuit 32 to the negative side terminal of the voltage driving power source 34, and the current activates the light emitting diode 31 and the light emitting diode 31 is lighted. At that time, because the intensity of the current that flows through the light emitting diode 31 is kept approximately at a constant value due to interposition of the current limiting resistor 33, and the light emitting diode 31 is lighted approximately at a constant brightness due to substantial current driving.

The abovementioned conventional floppy disc driving device is provided with the flexible printed circuit 32 for the light emitting diode driving circuit, and the flexible printed circuit 32 uses a conducting wire formed of copper (Cu) and the conductive wire is long. Such a structure results in relatively high cost of the light emitting diode driving circuit, and the manufacturing cost of a floppy disc driving device is resultantly high In this case, a method in which a membrane conductor, which is generally more inexpensive than the flexible printed circuit 32, is used may be employed. However, a membrane conductor cannot be used instead of a flexible printed circuit 32 without any additional contrivance because the resistance value of the membrane conductor is considerably higher than that of the flexible printed circuit 32 and the resistance value of a membrane conductor changes significantly with temperature change and humidity change. It is difficult to maintain light emitting brightness of a light emitting diode at a constant value continuously, and the light emitting brightness of a light emitting diode cannot be stabilized.

The present invention has been accomplished in view of the abovementioned technical background, and it is an object of the present invention to provide a low-cost floppy disc driving device that maintains light emitting brightness of a light emitting diode at a constant value continuously in which a membrane conductor is used for connecting between a light emitting diode and an integrated circuit for current driving of the light emitting diode.

SUMMARY OF THE INVENTION

To achieve the abovementioned object, a floppy disc driving device in accordance with the present invention is provided with a circuit substrate formed on one side of a chassis on which at least an integrated circuit and an interface connector are mounted, a light emitting diode located near the diskette insertion slot that emits light when a floppy disc is rotatively driven, and a connection conductor that connects between the circuit substrate and the light emitting diode, wherein the connection conductor is a membrane conductor formed by spreading coating material on one side of the chassis, and the light emitting diode is driven with a current supplied from the integrated circuit through the membrane conductor.

According to the abovementioned configuration, because the membrane conductor formed by spreading coating material on one side of the chassis as the connection conductor for connection between the circuit substrate and the light emitting diode, the membrane connector is considerably more inexpensive than that of a flexible printed circuit, which has been used as the conventional connection conductor of this type, and furthermore because the light emitting diode is driven with a current supplied from the integrated circuit through the membrane conductor, a current that flows through the light emitting diode can be maintained approximately at a constant value to resultantly maintain light emitting brightness of the light emitting diode at a constant value continuously even though a relatively high resistance value of the membrane conductor is changed or a resistance value varies significantly due to an environmental temperature change or an environmental humidity change The membrane conductor in the abovementioned means preferably contains carbon powder or silver paste as a main component.

By forming the membrane conductor as described hereinabove, the membrane conductor can be obtained by means of relatively simple means, and the membrane conductor is manufactured at a low cost.

DETAILED DESCRIPTION OF THE PREFERRED EMBODIMENT

An embodiment in accordance with the present invention will be described in detail hereinafter with reference to the drawings.

Figure 1:
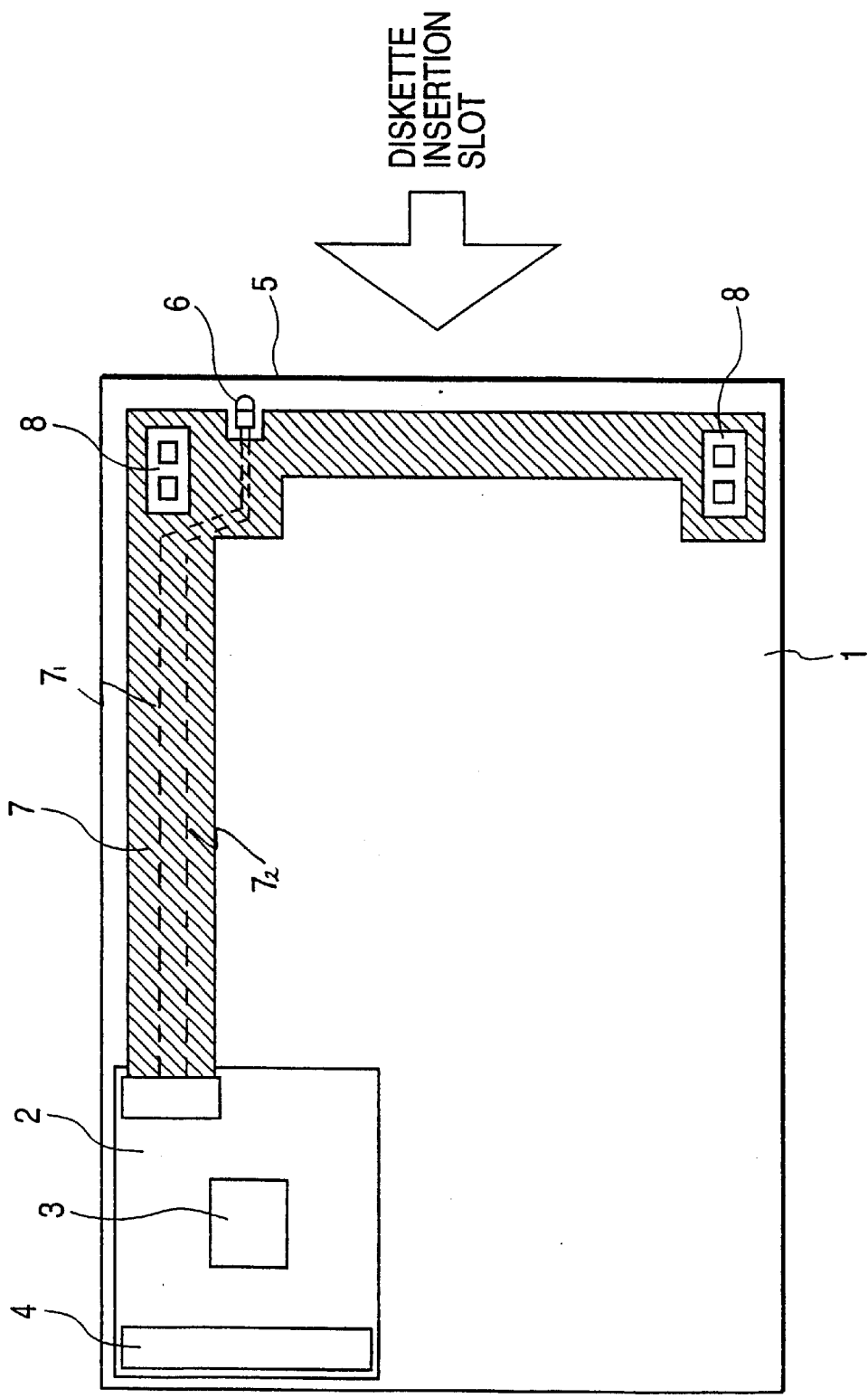
FIG. 1 is a front view showing one side of a chassis of a floppy disc driving device that is an embodiment of the floppy disc driving device in accordance with the present invention.

FIG. 1 is a front view showing one side of a chassis of an exemplary embodiment of a floppy disc driving device in accordance with the present invention.

As shown in FIG. 1, the floppy disc driving device in accordance with the present embodiment is provided with a chassis 1, a circuit substrate 2 mounted on one side of the chassis 1, an integrated circuit (IC) 3 and an interface connector 4 which are mounted on the circuit substrate 2, a front panel 5 having a diskette insertion slot (not shown in the drawing), a light emitting diode (LED) 6 located opposingly to a small aperture (not shown in the drawing) formed near the diskette insertion slot of the front panel 5, a membrane (coating film) conductor 7 that has been formed by spreading coating film material consisting mainly of carbon (C) particles on one side of the chassis 1, and a switch 8 provided in the chassis 1 that is served to switch the operation when a diskette is inserted or drawn out.

The circuit substrate 2 is mounted on one side of the chassis 1 located near the back side of the floppy disc driving device. The integrated circuit 3 that is mounted on the circuit substrate 2 is located approximately at the center of the circuit substrate 2, and is provided with a built-in control unit (not shown in FIG. 1) that is served to control components of the floppy disc driving device and a built-in current driving power source (not shown in FIG. 1) that is served for current driving of the light emitting diode 6. The interface connector 4 that is also mounted on the circuit substrate 2 is located on the back side of the floppy disc driving device, and is served to connect the control unit in the integrated circuit 3 to an external control unit such as a computer. The light emitting diode 6 is connected to the current driving power source in the integrated circuit 3 through the membrane conductor 7. The membrane conductor 7 is formed along the one side edge of the chassis 1 from the back side to the front side on the one side of the chassis 1 extending from the connector (not shown in the drawing) formed on the circuit substrate 2 to the light emitting diode 6, and a part of the membrane conductor 7 extends to the position where the switch 8 is located.

Figure 2:
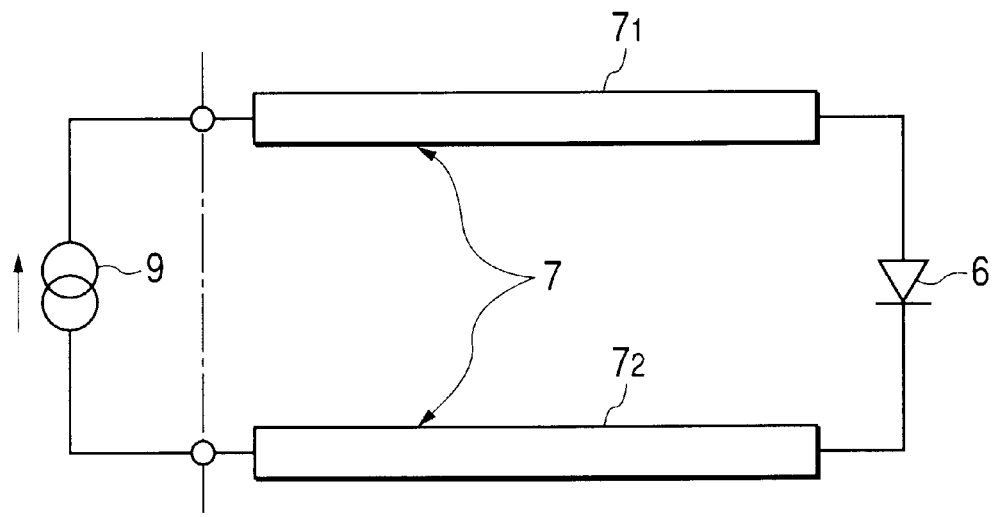
FIG. 2 is a circuit diagram showing an equivalent circuit of a light emitting diode driving circuit for the floppy disc driving device shown in FIG. 1.
Figure 3:
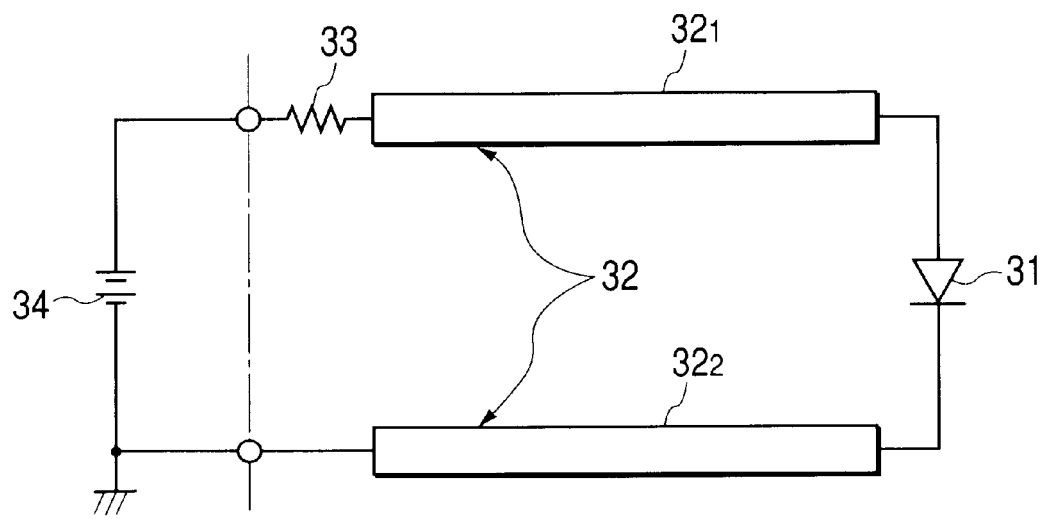
FIG. 3 is a circuit diagram showing a typical equivalent circuit of a light emitting diode driving circuit for a conventional floppy disc driving device.

Next, FIG. 2 is a circuit diagram showing an equivalent circuit of the light emitting diode driving circuit in the floppy disc driving device shown in FIG. 1. The same components shown in FIG. 2 as shown in FIG. 1 are given the same numerals.

As shown in FIG. 2, the light emitting diode driving circuit constitutes the light emitting diode (LED) 6 and the connection conductor, and is provided with a membrane conductor 7 having a first conductor $7_1$ and the second conductor $7_2$ and a current driving power source 9 that is provided in the integrated circuit 3.

The anode of the light emitting diode 6 is connected to one end of the first conductor $7_1$ of the membrane conductor 7, and the cathode is connected to one end of the second conductor $7_2$ of the membrane conductor 7. The other end of the first conductor $7_1$ of the membrane conductor 7 is connected to one end of the current driving power source 9, and the other end of the second conductor $7_2$ is connected to the other end of the current driving power source 9.

Next, the operation of the light emitting diode driving circuit having the abovementioned configuration will be described hereunder. When a diskette is inserted into the floppy disc driving device through the diskette insertion slot of the floppy disc driving device and the floppy disc of the inserted diskette is rotatively driven, the current driving power source 9 in the integrated circuit 3 is driven synchronously with rotation driving of the floppy disc, and a driving current is generated from the current driving power source 9. At that time, the output driving current is supplied from the one end of the current driving power source 9 to the anode of the light emitting diode 6 through the first conductor $7_1$ of the membrane conductor 7, and then supplied from the cathode of the light emitting diode 6 to the other end of the current driving power source 9 through the second conductor $7_2$ of the membrane conductor 7. As the result the driving current is supplied to light the light emitting diode 6.

At that time, generally, the resistance value of the first conductor $7_1$ and the second conductor $7_2$ of the membrane conductor 7 is relatively higher than a resistance value of a first conductor and a second conductor of a known flexible printed circuit and the resistance value of the first conductor $7_1$ and the second conductor $7_2$ of the membrane conductor 7 changes relatively more significantly due to environmental temperature change and humidity change than the resistance value of the first conductor and the second conductor of the conventional flexible printed circuit. However, an approximately constant current is supplied to the light emitting diode 6 regardless of the resistance value of the first conductor $7_1$ and the second conductor $7_2$ even though the resistance value of the first conductor $7_1$ and the second conductor $7_2$ of the membrane conductor 7 is relatively high and the resistance value is changeable significantly because the current generated from the current driving power source 9 drives the light emitting diode 6. As the result, the light emitting brightness of the light emitting diode 6 is maintained at a constant value continuously.

A case in which the membrane conductor 7 is formed by spreading coating material containing carbon (C) particles as a main component is exemplary described in the abovementioned embodiment, however, the coating material used for forming the membrane conductor 7 of the floppy disc driving device in accordance with the present invention is by no means limited to coating material containing carbon (C) as the main component. A case in which coating material containing silver (Ag) paste as a main component may be used though coating material containing silver paste as a main component is more expensive than coating material containing carbon (C) as a main component.

The use of the connection conductor of the membrane conductor 7 for connecting between the integrated circuit 3 and the light emitting diode 6 formed of coating material containing carbon (C) particles as a main component or the use of the membrane conductor 7 formed of coating material containing silver (Ag) paste as a main component allows the membrane conductor 7 to be formed easily by applying well-known simple coating film forming technique, and the manufacturing cost of the connection conductor is lower than that of the known connection conductor that is provided with the flexible printed circuit as the connection conductor for connecting between the integrated circuit 3 and the light emitting diode 6.

As described hereinabove, according to the present invention, the membrane conductor formed by spreading coating material on one side of the chassis as the connection conductor for connecting between the circuit substrate and the light emitting diode is significantly more inexpensive than the known flexible printed circuit that has been used as the connection conductor of this type. Furthermore, a current that flows through the light emitting diode can be maintained at a constant value even though the resistance value of the membrane conductor changes significantly with changing of environmental temperature and environmental humidity and the resistance value of the membrane conductor is relatively high because the light emitting diode is driven with a current through membrane conductor from the integrated circuit. As the result, light emitting brightness of the light emitting diode can be maintained at a constant value continuously.

What is claimed is:

1. A floppy disc driving device provided with a circuit substrate formed on one side of a chassis on which at least an integrated circuit and an interface connector are mounted, a light emitting diode located near the diskette insertion slot that emits light when a floppy disc is rotatively driven, and a connection conductor that connects the circuit substrate and the light emitting diode, wherein the connection conductor is a membrane conductor formed by spreading coating material on one side of the chassis, and the light emitting diode is driven with a current supplied from the integrated circuit through the membrane conductor.

2. The floppy disc driving device according to claim 1, wherein the membrane conductor contains carbon particles or silver paste as a main component.

* * * * *